United States Patent
Takami

(10) Patent No.: US 9,580,018 B2
(45) Date of Patent: Feb. 28, 2017

(54) DEVICE AND METHOD FOR RECORDING IMAGES OF A VEHICLE UNDERBODY

(71) Applicant: Robert Bosch GmbH, Stuttgart (DE)

(72) Inventor: Masato Takami, Heidelberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 224 days.

(21) Appl. No.: 14/404,161

(22) PCT Filed: May 14, 2013

(86) PCT No.: PCT/EP2013/059865
§ 371 (c)(1),
(2) Date: Nov. 26, 2014

(87) PCT Pub. No.: WO2013/178460
PCT Pub. Date: Dec. 5, 2013

(65) Prior Publication Data
US 2015/0165978 A1    Jun. 18, 2015

(30) Foreign Application Priority Data

May 31, 2012   (DE) .................. 10 2012 209 224

(51) Int. Cl.
| | | |
|---|---|---|
| *H04N 7/18* | (2006.01) | |
| *H04N 5/77* | (2006.01) | |
| *B60R 1/10* | (2006.01) | |
| *G02B 23/08* | (2006.01) | |
| *B60R 16/02* | (2006.01) | |

(52) U.S. Cl.
CPC .............. *B60R 1/105* (2013.01); *B60R 16/02* (2013.01); *G02B 23/08* (2013.01); *H04N 7/183* (2013.01)

(58) Field of Classification Search
CPC ........ H04N 7/183; B60R 16/02; B60R 1/105; G02B 23/08
USPC ......... 348/148; 386/200, 224, 223, 226, 227
See application file for complete search history.

(56) References Cited

U.S. PATENT DOCUMENTS

| | | |
|---|---|---|
| 7,102,665 B1 | 9/2006 | Chandler et al. |
| 2003/0185340 A1 | 10/2003 | Frantz |
| 2006/0170768 A1 | 8/2006 | Riley |
| 2008/0239079 A1 | 10/2008 | Millar |

FOREIGN PATENT DOCUMENTS

| | | |
|---|---|---|
| DE | 197 05047 | 8/1998 |
| DE | 100 38 731 | 2/2002 |
| DE | 102011003553 A1 * | 8/2012 |
| EP | 1 619 625 | 1/2006 |

(Continued)

OTHER PUBLICATIONS

International Search Report for PCT/EP2013/059865, dated Aug. 21, 2013.

*Primary Examiner* — Robert Chevalier
(74) *Attorney, Agent, or Firm* — Gerard Messina

(57) ABSTRACT

A recording device for recording images of an underbody of a vehicle includes: at least one camera recording images of areas of the underbody; and mirrors situated to project images of the underbody into the at least one camera. The mirrors are situated in such a way that the mirrors project adjoining areas of the underbody transversely to the driving direction of the vehicle into the camera as image areas situated one above the other.

9 Claims, 4 Drawing Sheets

(56) References Cited

FOREIGN PATENT DOCUMENTS

| | | |
|---|---|---|
| GB | 225 8321 | 2/1993 |
| GB | 227 1483 | 4/1994 |
| WO | WO 2006/059998 | 6/2006 |
| WO | WO 2006/091874 | 8/2006 |
| WO | WO 2006/093478 | 9/2006 |

* cited by examiner

DEVICE AND METHOD FOR RECORDING IMAGES OF A VEHICLE UNDERBODY

BACKGROUND OF THE INVENTION

1. Field of the Invention

The present invention relates to a device and a method for recording images of a vehicle underbody.

2. Description of the Related Art

Various devices and methods are known for video-based recording of an object with a large surface area such as, for example, the underbody of a vehicle.

Devices for recording the underbody of a vehicle are known, for example, as recording systems at monitoring stations, entrances or on streets. In these recording systems, a general distinction may be made between mobile devices such as, for example, a camera fastened to a rod, and permanently installed devices.

Permanently installed devices are described in, among others, US Patent Application Publication 2006/170768 A1, international patent application publication WO 2006/059998 A, UK patent application publication GB 2271483 A, US Patent Application Publication 2003/0185340 A1, European patent application publication EP 1619625 A2 and U.S. Pat. No. 7,102,665 B1. In these recording systems, the underbody of a passing vehicle is visually recorded using a single camera or a series of cameras installed transversely to the driving direction.

Similar systems, in which the visual beam of the camera is directed to the underside of the vehicle with the aid of a mirror, are described, for example, in US Patent Application Publication 2008/0239079 A1, UK patent application publication GB-2258321 A and international patent application publication WO 2006/093478 A1.

German patent application publication DE 197 05 047 A1 describes a method and a device for measuring the tread depth of a motor vehicle tire. In this case the tread pattern of the motor vehicle tire is acted upon by laser light from a laser. The laser light produces a light spot on the tread surface of the motor vehicle tire. The light reflected from the tread pattern is detected by an image-resolving sensor. The image-resolving sensor in this case observes the position and/or the shape of the light spot. The signals of the image-resolving sensor are processed to produce output data in accordance with the tread depth. During measurement, the motor vehicle tire rotates, so that the measurement may be carried out at multiple points of the tread pattern.

BRIEF SUMMARY OF THE INVENTION

The object of the present invention is to improve in a cost-efficient manner the visual resolution of a device for recording the underbody of a vehicle and to reduce the space required for such a device.

A recording device according to the present invention for recording images of an underbody of a vehicle has at least one camera, which is designed to record images of areas of the vehicle underbody, and mirrors, which are designed and situated in order to project images of the underbody into the image recording area of the at least one camera. In this arrangement, the mirrors are situated, in particular, in such a way that they project adjoining areas of the underbody transversely to the driving direction of the vehicle into the image recording area of the camera as image areas situated one above the other.

The present invention also includes a method for recording images of an underbody of a vehicle having a recording device according to the present invention, as has been described above. In particular, the method includes driving over the recording device with the vehicle and, while driving over, recording images of areas of the underbody offset to the driving direction.

In this method, the mirrors are arranged in such a way that they modify the format of the recorded image areas. In particular, a long, narrow area of the underbody of a vehicle is projected onto an area having an aspect ratio typical of cameras of, for example, 1:1, 1:2 or 3:4, by projecting adjoining areas of the underbody onto areas of the image lying one above the other. The resulting image may be easily recorded with a conventional, low-cost camera.

In the systems known from the related art, a plurality of cameras or a suitably shaped mirror is used for recording images, in order to fully record the vehicle underbody. A plurality of cameras is inevitably associated with higher costs and large quantities of data, which must be transmitted and processed. The variant, in which a mirror is used in order to extend the visual beam and thereby obtain a larger field of vision, is usually associated with the need for a large installation space. In addition, the resolution in proportion to the field of vision is reduced in such an arrangement, so that a very high-resolution camera is required in order not to diminish the resolution of the recorded images.

The recording device described herein enables the recording of objects having a large surface area, in particular, objects having an unequal aspect ratio, and the use of a reduced number of cameras with a simultaneous reduction in the demands placed on the optical components, in conjunction with limited installation space. In this way, costs as well as installation space may be saved.

By using mirrors, which divide the image into an upper and a lower image half, it is possible to reduce the number of cameras needed for image recording. The upper and lower image halves in this case reproduce in particular left and right adjoining areas of the underbody one above the other.

The resolution in the vertical direction is reduced as a result; however, it is increased in the horizontal direction, which is desirable in this case. If needed, the principle may also be implemented in reverse, so that the vertical resolution is increased and the horizontal resolution is reduced.

The number of cameras may be reduced as a result of the present invention, without reducing the resolution in the horizontal (or, alternatively, vertical) direction. Hence, there is no need to resort to expensive cameras having particularly high resolution.

In one specific embodiment, the mirrors are situated in such a way that they extend the visual path between the at least one camera and the underbody of the vehicle. By extending the visual beam in a limited space with the aid of mirrors, which direct the visual beam repeatedly back and forth, the visual distortions are less than when alternatively using a powerful wide-angled lens or mirror. Moreover, achieving the necessary depth of field places lower demands on the visual components as a result of the extended visual beam.

In one specific embodiment, the mirrors are situated in such a way that they utilize the installation space transversely to the driving direction of the vehicle, in order to extend the visual path between the at least one camera and the underbody of the vehicle. In this way, it is possible to implement a device, particularly compact in the longitudinal direction of the vehicle, which includes a long visual path.

In one specific embodiment, the mirrors are situated in such a way that they utilize the installation space parallel to the driving direction of the vehicle, in order to extend the visual path between the at least one camera and the underbody of the vehicle. In this way, it is possible to implement a device, particularly compact in the transverse direction of the vehicle, which includes a long visual path.

In one specific embodiment, the cameras and the mirrors are situated in a drive-over channel, which is designed to be driven over by the vehicle to be recorded. In one drive-over channel, the camera and the mirrors are well protected from damage and contamination, but simultaneously enable a good recording of the underbody of the vehicle.

In one specific embodiment, the drive-over channel is sealed by a cover, in which an opening facing the underbody of the vehicle is formed, which extends essentially transversely to the driving direction of the vehicle. Such an opening makes it possible to record strip-shaped images of strip-shaped areas of the underbody of the vehicle. With the combination of multiple photos recorded in chronological sequence as the vehicle passes over, it is possible to produce an image of the entire underbody of the vehicle.

In one specific embodiment, a method according to the present invention includes detecting areas in the recorded images associated with the underbody of the vehicle, and to use only these images for evaluation.

By filtering out areas of the recorded images, which are not relevant for the evaluation of the underbody, the method becomes more robust, in particular, in conjunction with a minimal decalibration.

In one specific embodiment, a method according to the present invention includes calculating a visual flow between chronologically consecutive images, and to use for evaluation only areas of the images in which flow vectors are found. The evaluation of the visual flow makes it possible to reliably identify the areas associated with the underbody of the vehicle.

The present invention is explained below with reference to the appended figures.

DETAILED DESCRIPTION OF THE INVENTION

Figure 1:
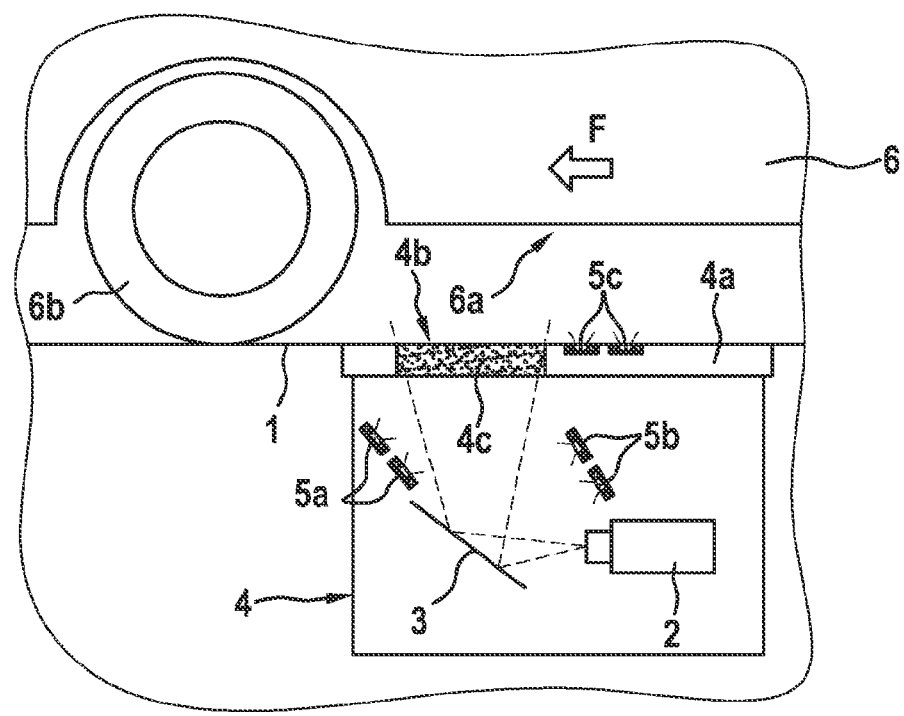
FIG. 1 shows a side sectional view of a first exemplary embodiment of a recording device according to the present invention.

FIG. 1 shows a side view of a first exemplary embodiment of a recording device according to the present invention, which is installed in a drive-over channel 4 formed below a roadway level 1.

Drive-over channel 4 is sealed on its upper side facing vehicle 6 with a cover 4a, in which an opening 4b is formed. Opening 4b may be sealed with a transparent pane 4c made of glass or plexiglass, in order to avoid penetration of dirt into drive-over channel 4.

For reasons of clarity, opening 4b is shown in FIG. 1 to be disproportionately wide. In reality, opening 4b is generally only a few centimeters wide, so that it may easily be driven over by tires 6b of vehicle 6.

Opening 4b extends at least across the entire width of vehicle 6 and, therefore, has a significantly larger extension (generally more than 2 m) transversely to driving direction F (perpendicular to the drawing plane of FIG. 1) than in driving direction F (generally a few centimeters).

A camera 2 and a mirror system 3 are situated in drive-over channel 4 in such a way that, via mirror system 3, camera 2 is able to record an image of underbody 6a of vehicle 6.

Illumination devices 5a, 5b, 5c are situated in such a way that they directly and/or indirectly illuminate underbody 6a via mirror system 3. To demonstrate various possible installation locations of illumination devices 5a, 5b, 5c, multiple illumination devices 5a, 5b, 5c are shown in FIG. 1, each of which are situated in drive-over channel 4 or on cover 4a of drive-over channel 4. In practice, however, not all of these illumination devices 5a, 5b, 5c need be present simultaneously.

To record images of underbody 6a, vehicle 6 travels in driving direction F from right to left over opening 8b, which is formed in cover 4a of driver-over channel 4. The vehicle may, of course, also travel from left to right over the opening. During the drive-over of vehicle 6, camera 2 is repeatedly triggered, in order to record multiple images of various strip-shaped areas of underbody 6a of vehicle 6 through opening 4b formed in cover 6.

If camera 2 has a standard image format, for example, with an aspect ratio of 4:3, then, in a conventional arrangement based on the previously described unequal aspect ratio of opening 4b, a large part of the recording area of the film or image sensor of camera 2 is not utilized. Thus, in order to achieve the desired resolution in the direction transverse to driving direction F (long extension of opening 4b), it would be necessary to use a high resolution camera or an expensive special-purpose camera, which has a corresponding aspect ratio.

Thus, according to the present invention, the coverage area of camera 2 is divided by a suitably designed mirror system 3 into at least two halves according to height, each of which are deflected laterally so that adjoining areas of underbody 6a are projected into areas of the coverage area of camera 2 situated one above the other.

Figure 2A:
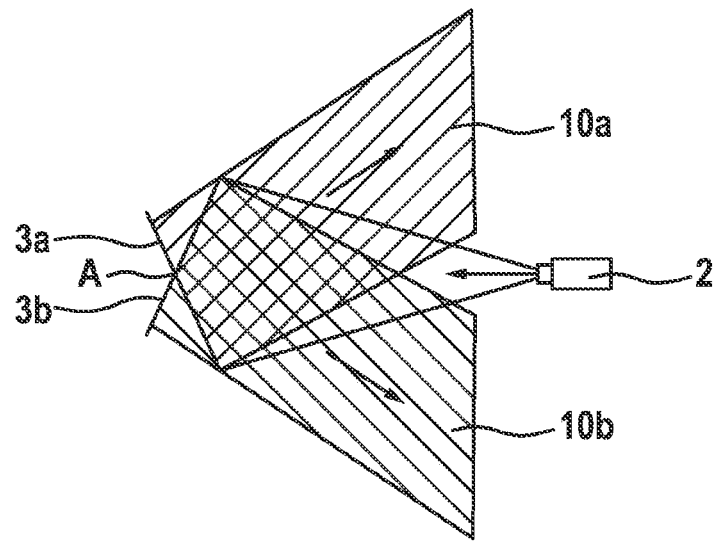
FIGS. 2a through 2c illustrate the splitting of the camera image by a mirror arrangement according to the present invention according to a first exemplary embodiment.
Figure 2B:
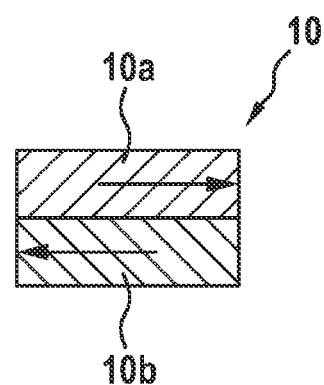
Figure 2C:
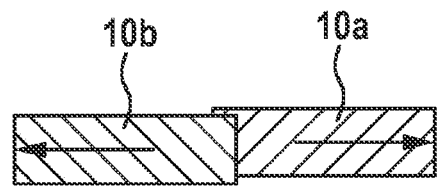

FIGS. 2a through 2c illustrate the splitting according to the present invention of the coverage area of camera 2 into an upper and a lower half and the deflection of the field of vision by a suitable mirror system 3a, 3b.

FIG. 2a shows an arrangement having a camera 2 and two mirrors 3a, 3b, "from above," i.e., from the view of opening 4b formed in cover 4a.

The two mirrors 3a and 3b are situated above one another perpendicularly to the drawing plane and rotated relative to one another in relation to an axis A, which also extends perpendicularly to the drawing plane, so that a first lateral area of underbody 6a is projected into an upper area 10a of coverage area 10 of camera 2, and a second lateral area of underbody 6a is projected into a lower area 10b of coverage area 10 of camera 2.

FIG. 2b schematically shows coverage area 10 having an upper area 10a, which corresponds to a first lateral area of underbody 6a, and a lower area 10b, which corresponds to a second lateral area of underbody 6a.

FIG. 2c illustrates how the two areas 10a and 10b are adjoining underbody 6a of vehicle 6.

The use of two mirrors 3a, 3b situated one above the other shown in FIGS. 2a through 2c is merely exemplary. For those skilled in the art, it is obvious that additional mirrors may be provided, if necessary, in order to subdivide underbody 6a of vehicle 6 visually into more than two areas 10a, 10b and to project several of these areas one above the other into camera 2.

FIGS. 3a through 3d show a second exemplary embodiment of a mirror system according to the present invention, in which additional mirrors 7a, 7b, 8 are also provided, in order to extend the visual path between camera 2 and underbody 6a of vehicle 6.

Figure 3A:
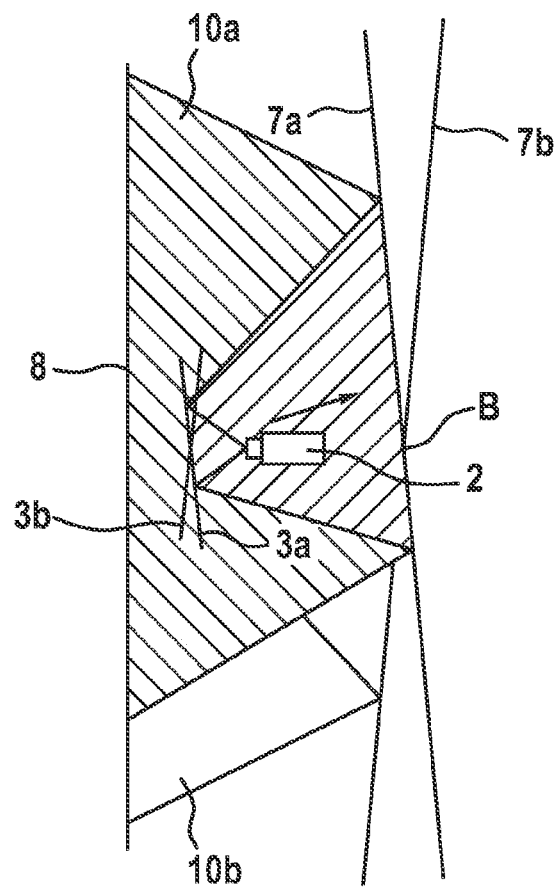
FIGS. 3a through 3d illustrate the splitting of the camera image by a mirror arrangement according to the present invention according to a second exemplary embodiment.
Figure 3B:
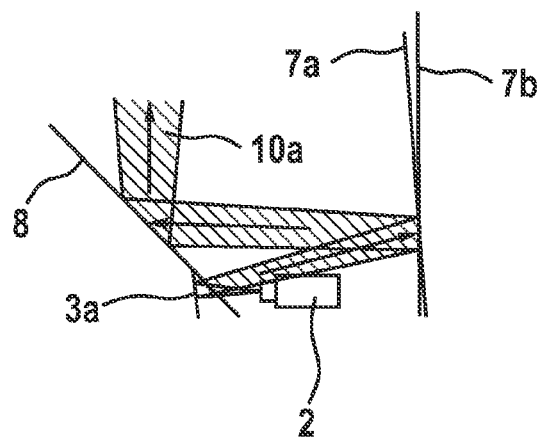

FIGS. 3a and 3b schematically show in a top view (FIG. 3a) and a side view (FIG. 3b) the radiation path of upper image area 10a.

The two first mirrors 3a, 3b situated opposite camera 2 correspond to mirrors 3a, 3b shown in FIG. 2a.

Image area 10a reflected from upper first mirror 3a is reflected by an opposing upper second mirror 7a situated behind camera 2 and projected onto a third mirror 8, which, from the view of camera 2, is situated behind first mirrors 3a 3b, and projects the visual beam onto underbody 6a of vehicle 6.

Figure 3C:
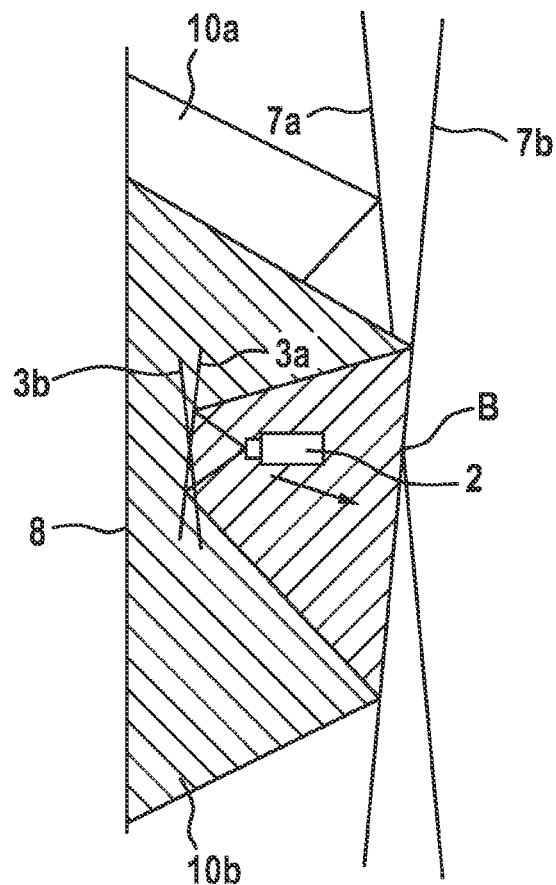
Figure 3D:
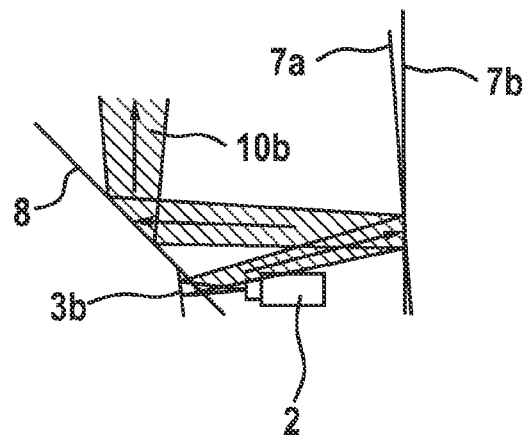

FIGS. 3c and 3d schematically show the radiation path of lower image area 10b in a top view (FIG. 3c) and a side view (FIG. 3d).

Second image area 10b reflected by lower first mirror 3b is projected onto third mirror 8, which deflects the visual beam to underbody 6a of vehicle 6, by a second lower mirror, which is also situated behind camera 2 and which is rotated relative to upper second mirror 7a about an axis B situated perpendicularly to the drawing plane of FIGS. 3a and 3c.

With the arrangement of multiple mirrors shown in FIGS. 3a through 3d, the visual path of the visual beams is extended between camera 2 and underbody 6a of vehicle 6 parallel to driving direction F of vehicle 6. Alternatively, mirrors 3a, 3b, 7a, 7b, 8 may also be situated in such a way that the visual beams utilize the installation space transversely to driving direction F of vehicle 6, before they are deflected upwardly by third mirror 8 onto underbody 6a of vehicle 6.

With the extension of the visual path of the visual beams shown in FIGS. 3a through 3c, the field of vision of camera 2 is enlarged, without using a powerful wide-angle lens. Since an extended visual beam approximates an affine image more closely than a powerful wide-angle lens, this results in fewer distortions and the quality of the images recorded by camera 2 is improved.

What is claimed is:

1. A recording device for recording images of an underbody of a vehicle, comprising:
   at least one camera configured to record images of areas of the underbody; and
   mirrors arranged to project images of areas of the underbody into the at least one camera, wherein the mirrors are situated to project adjoining areas of the underbody transversely to the driving direction of the vehicle simultaneously into the camera as image areas, the image areas being stacked one above the other, each of the mirrors projecting into a different one of the stacked image areas relative to one another.

2. The recording device as recited in claim 1, wherein the mirrors are situated in such a way to extend the visual path between the at least one camera and the underbody of the vehicle.

3. The recording device as recited in claim 2, wherein the mirrors are situated in such a way to utilize installation space transversely to the driving direction of the vehicle, in order to extend the visual path between the at least one camera and the underbody of the vehicle.

4. The recording device as recited in claim 2, wherein the mirrors are situated in such a way to utilize installation space parallel to the driving direction of the vehicle, in order to extend the visual path between the at least one camera and the underbody of the vehicle.

5. The recording device as recited in claim 2, wherein the camera and the mirrors are situated in a drive-over channel configured to be driven over by the vehicle to be recorded.

6. The recording device as recited in claim 5, wherein the drive-over channel is sealed by a cover having an opening facing the underbody of the vehicle, the opening extending essentially transversely to the driving direction of the vehicle.

7. A method for recording images of an underbody of a vehicle, comprising:
   providing a recording device including:
      at least one camera configured to record images of areas of the underbody; and
      mirrors arranged to project images of areas of the underbody into the at least one camera, wherein the mirrors are situated to project adjoining areas of the underbody transversely to the driving direction of the vehicle simultaneously into the camera as image areas, the image areas being stacked one above the other, each of the mirrors projecting into a different one of the stacked image areas relative to one another; and
   driving over the recording device with the vehicle.

8. The method as recited in claim 7, further comprising:
   detecting areas associated with the underbody of the vehicle in the recorded images; and
   only using the detected areas associated with the underbody for evaluation.

9. A method for recording images of an underbody of a vehicle comprising:
   providing a recording device including:
      at least one camera configured to record images of areas of the underbody; and
      mirrors arranged to project images of areas of the underbody into the at least one camera, wherein the mirrors are situated to project adjoining areas of the underbody transversely to the driving direction of the vehicle into the camera as image areas situated one above the other;
   driving over the recording device with the vehicle;
   detecting areas associated with the underbody of the vehicle in the recorded images;
   only using the detected areas associated with the underbody for evaluation;
   calculating a visual flow between chronologically consecutive images; and
   only using areas of the images in which flow vectors are found for evaluation.

* * * * *